United States Patent
Jargeaix

Patent Number: 5,873,578
Date of Patent: *Feb. 23, 1999

[54] GASKET FOR INTERNAL COMBUSTION ENGINE AND METHOD FOR FORMING SAME

[75] Inventor: Gérard Jargeaix, Lyons, France

[73] Assignee: Curty Payen S.A., Saint Priest, France

[*] Notice: This patent issued on a continued prosecution application filed under 37 CFR 1.53(d), and is subject to the twenty year patent term provisions of 35 U.S.C. 154(a)(2).

[21] Appl. No.: 678,675

[22] Filed: Jul. 11, 1996

[30] Foreign Application Priority Data

Jul. 11, 1995 [FR] France .................................. 95 08629

[51] Int. Cl.⁶ ...................................................... F16T 15/12
[52] U.S. Cl. ............................................ 277/601; 277/600
[58] Field of Search ..................................... 277/235 B, 9, 277/11, 180, 178, 601, 591, 597, 600

[56] References Cited

U.S. PATENT DOCUMENTS 3,668,036  6/1972  Farnam ................................. 277/235 B
4,976,225 12/1990  Stang et al. .
5,341,779  8/1994  Chen et al. ........................... 277/235 B

FOREIGN PATENT DOCUMENTS 2 241 729  3/1975  France .
2 446 970  8/1980  France .
39 39 572  6/1991  Germany .
   214572  9/1988  Japan ................................. 277/235 B Primary Examiner—Daniel G. DePumpo
Attorney, Agent, or Firm—Oliff & Berridge PLC

[57] ABSTRACT

A gasket has a flat body with openings provided for combustion chambers, lubricating fluid passages, engine coolant passages, and studs mounting a cylinder head on an engine block. Each of the combustion chamber openings is bordered by a sealing element defining an armor ring. Each armor ring has a tab located on its outer edge, extending over at least part of its periphery, attached to the gasket body enabling the armor ring to move perpendicularly to and/or in the plane of the gasket body.

15 Claims, 2 Drawing Sheets

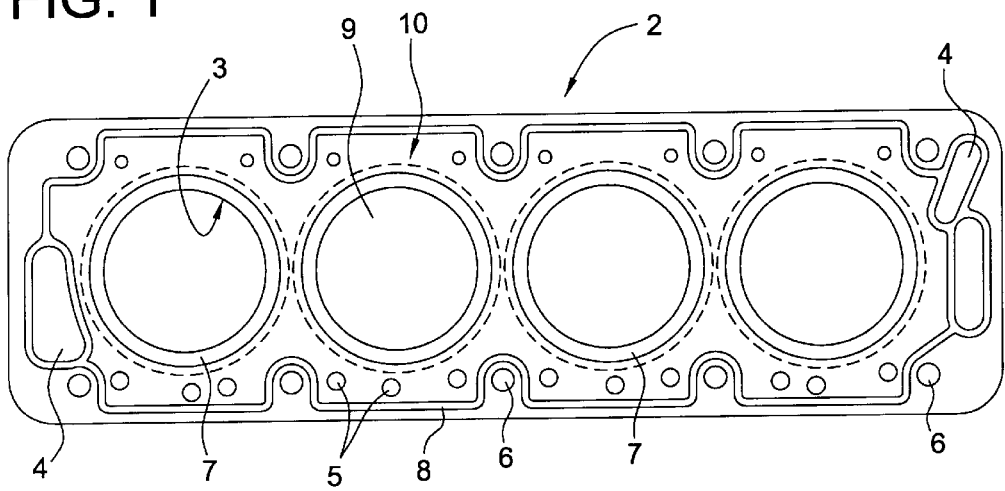
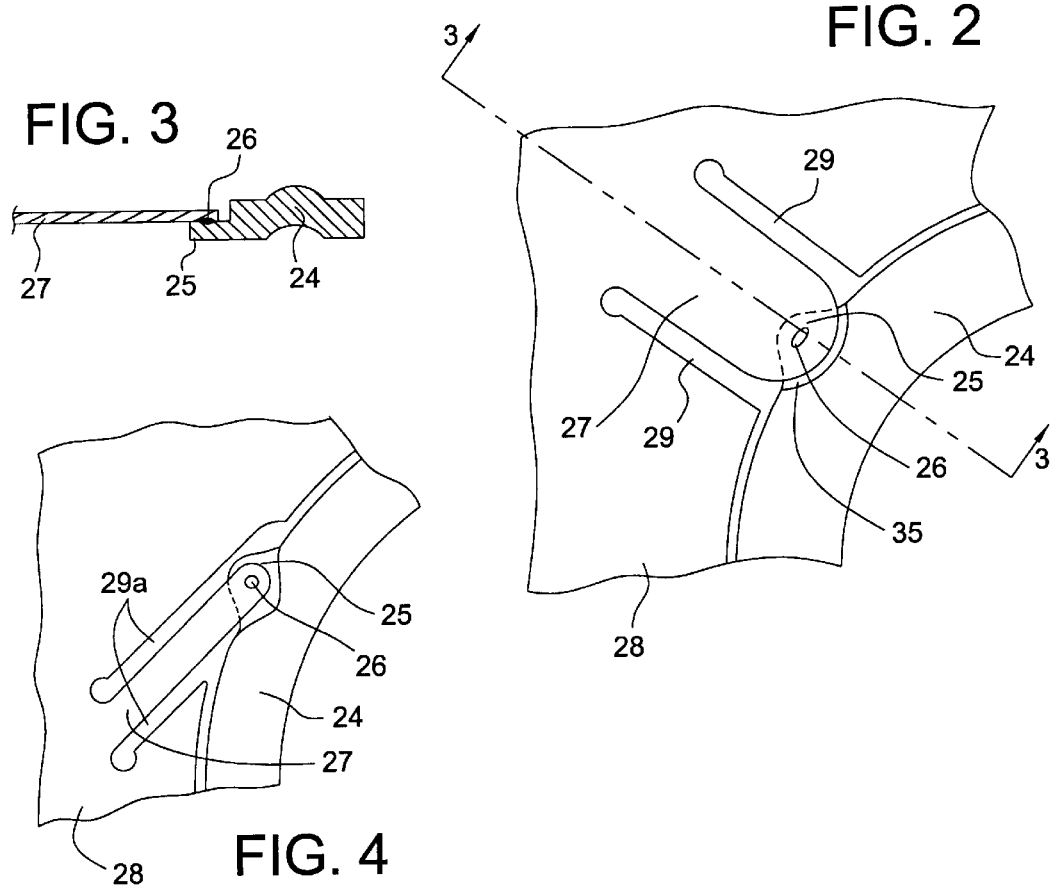

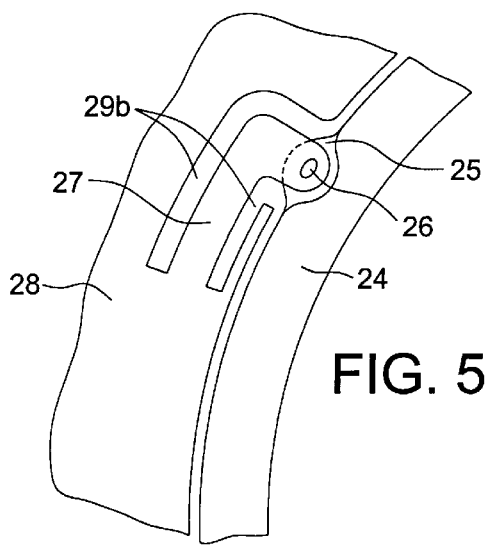
FIG. 5
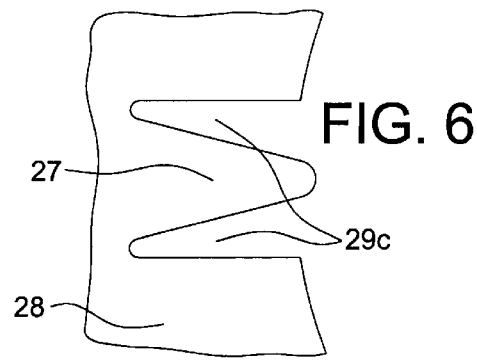
FIG. 6
FIG. 7
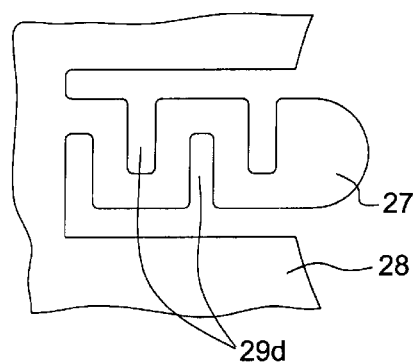
FIG. 8
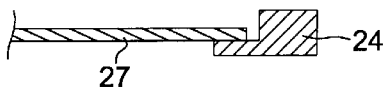
FIG. 9
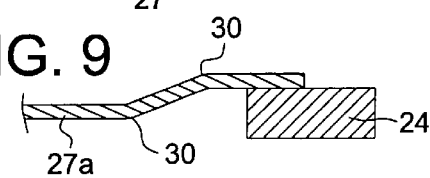
FIG. 10
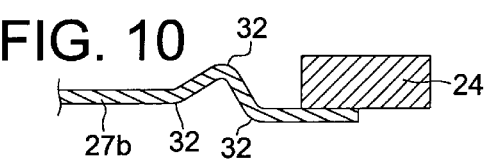
FIG. 11
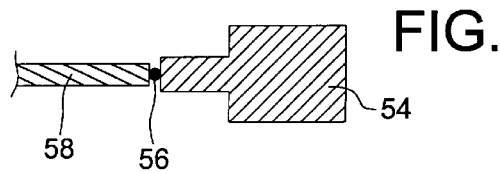

GASKET FOR INTERNAL COMBUSTION ENGINE AND METHOD FOR FORMING SAME

BACKGROUND OF THE INVENTION

The present invention relates to a gasket for an internal combustion engine, particularly a cylinder head gasket and method for forming the same.

The purpose of the cylinder head gasket is to provide a seal between the engine block and the cylinder head to retain liquids such as engine lubricating fluid and engine coolant. The engine block and the cylinder head combine to form combustion chambers, inside which the pistons are displaceably mounted.

Even if the cylinder head gaskets are made with great care, centering of an armor ring relative to the corresponding combustion chamber is not always perfect, especially if allowable manufacturing tolerances for the engine blocks and cylinder heads are taken into account. Furthermore, during engine operation, an increase in temperature is not consistent over the entire surface of the gasket, and thus parasitic stresses may arise due to different expansion at different points in the gasket.

One solution is to totally separate the body of the gasket from the armor rings and then mount the armor rings on the engine block independently of the gasket. However, this solution is unsatisfactory because it greatly increases the number of steps of operation, with the risk of possibly losing the body and the armor rings.

French Patent FR-A-2,446,970 discloses a cylinder head gasket in which the armor ring has a tab engaged in a slot in the gasket body to allow floating mounting of the armor ring. However, reduction to practice is complex and the armor ring is not integral with the body.

SUMMARY OF THE INVENTION

One object of the present invention is to furnish a single gasket that is simple to mount, while ensuring independence of the various parts of the gasket during operation.

Another object of the present invention is to allow centering of the armor rings relative to the combustion chambers while permitting some latitude in displacement of the armor rings perpendicular to the gasket plane.

In order to accomplish the above stated objects of the invention, a gasket is disclosed having a flat body in which openings are provided for combustion chambers, lubricating fluid passages, engine coolant passages and openings for passage of studs mounting the cylinder head on the engine block. Each of the combustion chamber openings is bordered by a sealing element defining an armor ring. Each armor ring has a tab located on its outer edge extending along at least part of the ring's periphery. The tab is attached to the gasket body allowing the armor ring to move perpendicularly to the gasket body and/or in the plane of the gasket body.

According to a first aspect of the present invention, a gasket is disclosed having a substantially flat gasket body in which at least one combustion chamber opening is provided. The at least one combustion chamber opening is bordered by an armor ring and a tab is located on an outer edge of the armor ring extending along at least part of an outer periphery of the armor ring. The tab is attached to the substantially flat gasket body whereby the armor ring is capable of moving in a direction perpendicular to the substantially flat gasket body and/or within a plane containing the substantially flat gasket body.

According to a second aspect of the present invention, a gasket is disclosed having a substantially flat gasket body in which at least one opening is provided. An armor ring is located within the at least one opening and provided with structure for connecting the armor ring to the substantially flat gasket body such that the armor ring can move in a direction perpendicular to the substantially flat gasket body and/or within a plane containing the substantially flat gasket body.

According to a third aspect of the present invention, a method for forming a gasket includes providing a substantially flat gasket body with at least one opening, installing an armor ring into the at least one opening, and connecting the armor ring to the substantially flat gasket body such that the armor ring can move in a direction perpendicular to the substantially flat gasket body and/or within a plane containing the substantially flat gasket body.

The present invention yields a gasket in a unitary form that is simple to mount and has the ability to center armor rings, resulting in improved gas impermeability. The armor rings can be displaced perpendicularly to the gasket plane allowing separation of the rings from the rest of the gasket, which is particularly advantageous during engine operation because it eliminates parasitic stresses in the gasket and surrounding structure.

The gasket body can be made of a material and have a thickness different from that of the armor rings. The gasket body thickness is selected to optimize the gas impermeability of the seal at the combustion chambers. The material of which the gasket body and the armor rings is made can be chosen independently allowing functional optimization of the goals in view.

According to another embodiment of the present invention, each armor ring may be attached rigidly to part of the gasket body and mounted flexibly relative to the rest of the gasket body. Also, the tab of each armor ring may extend discontinuously along the periphery of the ring, forming ears. Each ear may be rigidly attached to a tongue of the gasket body. Cutouts may be provided in the gasket body and terminate in the opening intended for mounting an armor ring. The cutouts allow the formation of each tongue to be straight, of constant or variable width, oriented substantially radially to the opening of the combustion chamber, or inclined relative to a radial orientation line extending from a center of the opening of the combustion chamber. The cutouts may also be shaped as a broken or zig-zag line, depending on the desired shape of the gasket and the sought-after separation effects between the armor ring and the gasket body.

In order to achieve a desired flexibility of deformation, each tongue may have bends made in a direction away from the plane of the gasket body. Each tongue may have no bends, or may have several successive bends.

According to another embodiment of the present invention, the tab of each armor ring may be attached to the gasket body by a flexible material such as a glue or resin that withstands the operating conditions of the engine, i.e.— temperature and pressure.

These and other objects and advantages of the invention will be better understood with reference to the attached drawings, which show several embodiments of the present invention serving as non-limiting examples of the present invention.

BRIEF DESCRIPTION OF THE DRAWINGS

The preferred embodiments are described with reference to the drawings in which:

FIG. 1 is a top view of the cylinder head gasket of the present invention;

FIG. 2 is a top view showing one embodiment of the structure for mounting the armor ring on the gasket body;

FIG. 3 is a cross section of the structure for mounting the armor ring on the gasket body taken along section lines 3—3 of FIG. 2;

FIGS. 4 and 5 are top views of second and third embodiments of the present invention showing the structure for mounting the armor ring on the gasket body;

FIGS. 6 and 7 are top views of two different embodiments of the present invention of the cutouts intended for accommodating the tongues;

FIGS. 8, 9, and 10 are lengthwise cross-sections of three different embodiments of the present invention for the tongue of a gasket body and the tab of an armor ring; and FIG. 11 is a cross-sectional view showing yet another embodiment of the present invention for the tongue of a gasket body and the tab of an armor ring.

DETAILED DESCRIPTION OF PREFERRED EMBODIMENTS

Various embodiments relating to assembly of an armor ring on the body of a gasket apply to a cylinder head gasket 2 as shown in FIG. 1. Neither the shape of the cylinder head gasket nor the number of combustion chambers is limiting.

FIG. 1 shows an engine block 2 with a cylinder head gasket according to the present invention located thereon. A plurality of openings are provided in the gasket body, including; openings 9 for piston chambers, openings 6 for studs that mount the cylinder head to the engine block, openings 5 for engine coolant to pass through the engine block and cylinder head, and openings 4 for other fluids such as oil to pass through the engine block and cylinder head. The gasket 2 is defined by a peripheral edge 8 and includes armor rings 7 provided inside the openings 9 for the piston chambers. Armor rings 7 have an inner peripheral edge 3 that faces the inside of the piston chamber when the gasket 10 and armor rings 7 are positioned correctly on the engine block 2.

FIGS. 2 and 3 show an armor ring 24 that has at least one ear 25 (extending from a tab) located on its periphery, each ear is joined by a weld 26 to a tongue 27 defined by cutouts 29 provided in a body 28 of the gasket.

In the embodiment shown in FIG. 2, the cutouts 29 are straight, of constant width, parallel, and oriented substantially radially from the center of the combustion chamber. Thus it is possible to achieve a floating mount for ring 24 relative to body 28 such that the ring can move perpendicularly to the body. Tongue 27 is defined by the cutouts 29, which provide flexibility and deformability required to achieve a floating mount.

The embodiment of FIG. 4 has cutouts 29a that are inclined with respect to a radial extension from the center of the combustion chamber.

The embodiment of FIG. 5 has cutouts 29b that have a first portion oriented approximately parallel to the outer surface of the armor ring 24 and a second portion terminating at the opening and extending in a substantially radial direction from the center of the opening.

The embodiment of FIG. 6 has cutouts 29c oriented substantially radially with a width that increases in the direction of the combustion chamber opening.

The embodiment of FIG. 7 has cutouts 29d that have the shape of broken or zig-zag lines.

FIG. 8 represents an embodiment in which tongue 27 is planar. In the embodiment shown in FIG. 9, tongue 27a has two bends 30, and in the embodiment shown in FIG. 10, tongue 27b has three successive bends 32. The presence of the bends 30 or 32, and their number and value, allows flexibility in the mounting of the armor ring relative to the gasket body.

In the embodiment shown in FIG. 11, an armor ring 54 is attached to gasket body 58 by means of an element 56 made of a flexible material such as a glue, a resin, or a polymer that can withstand the engine operating conditions, i.e., temperature and pressure.

The present invention provides a considerable improvement to existing technology by furnishing a cylinder head gasket for an internal combustion engine that is simple in design and in which centering, gas impermeability and free displacement of each ring are achieved.

The invention is not confined to the embodiments of the cylinder head gasket described above. Rather, the present invention covers many alterative embodiments. For example, in the various embodiments, the armor ring has been shown as being thicker than the gasket body. However, these thicknesses could be reversed. The tab of the armor ring has also been represented as extending discontinuously at the periphery of the armor ring. However, this tab could extend continuously.

Some of the characteristics defined in the framework of one embodiment could be combined differently, according to need, without constituting a departure from the present invention.

The invention can also apply to a cylinder head gasket having a different number of openings. For example, a gasket for a single cylinder, or a gasket with no opening for passage of coolant or without an opening for passage of the tightening studs would not depart from the spirit and scope of the present invention. Likewise, the present invention may apply to a manifold gasket, which may have several openings, only some of which are provided with an armor ring.

The invention has been described with reference to the above described preferred embodiments, which are meant to be illustrative, not limiting. Various modifications can be made without departing from the spirit and scope of the invention as defined in the appended claims.

What is claimed is:

1. A gasket comprising:
   a substantially flat gasket body having at least one combustion chamber opening;
   an armor ring bordering said at least one combustion chamber opening; and
   at least one tab located on an outer edge of the armor ring and rigidly attached to a first portion of the substantially flat gasket body, the first portion being more flexible and movable relative to second portions of the substantially flat gasket body located immediately adjacent the first portion and along the inner circumference of the combustion chamber opening, wherein the armor ring is capable of moving in at least one of a direction perpendicular to the substantially flat gasket body and a direction within a plane containing the substantially flat gasket body.

2. The gasket according to claim 1, wherein the tab of the armor ring extends discontinuously along the periphery of the armor ring to form at least one ear that is attached to a tongue formed in the substantially flat gasket body, and wherein said tongue is defined by cutouts extending to the at least one combustion chamber opening in the substantially flat gasket body.

3. The gasket according to claim 2, wherein said cutouts are oriented along an essentially radial direction from a center of the at least one combustion chamber opening.

4. The gasket according to claim 2, wherein said cutouts are essentially linear and inclined with respect to a radial extension from a center of the at least one combustion chamber opening.

5. The gasket according to claim 2, wherein said ear is rigidly attached to said tongue.

6. The gasket according to claim 2, wherein said cutouts are shaped as zig-zag lines.

7. The gasket according to claim 6, wherein the tongue has at least one bend in a direction away from a plane containing the substantially flat gasket body.

8. The gasket according to claim 4, wherein the tongue has at least one bend in a direction away from a plane containing the substantially flat gasket body.

9. The gasket according to claim 2, wherein the tongue has at least one bend in a direction away from a plane containing the substantially flat gasket body.

10. The gasket according to claim 1, wherein the gasket is a cylinder head gasket and includes openings for lubricating fluid, engine coolant, and studs mounting a cylinder head on an engine block.

11. A gasket comprising:

a substantially flat gasket body in which at least one opening is provided;

an armor ring located within said at least one opening; and means for connecting the armor ring to the substantially flat gasket body such that the armor ring can move in at least one of a direction perpendicular to the substantially flat gasket body and a direction within a plane containing the substantially flat gasket body while connected to the substantially flat gasket body.

12. The gasket according to claim 11, wherein the means for connecting the armor ring to the substantially flat gasket body includes an ear that is attachable to a tongue in the substantially flat gasket body.

13. The gasket body according to claim 12, wherein the tongue is defined by two cutouts in the substantially flat gasket body, and wherein said cutouts extend to the at least one opening in the substantially flat gasket body.

14. The gasket body according to claim 12, wherein the tongue is defined by two cutouts in the substantially flat gasket body, and said cutouts are inclined with respect to a radial line extending from a center of the at least one opening.

15. The gasket according to claim 12, wherein the tongue has at least one bend in a direction away from a plane containing the substantially flat gasket body.

* * * * *